(12) United States Patent
Williams

(10) Patent No.: US 9,623,609 B2
(45) Date of Patent: Apr. 18, 2017

(54) METHOD OF MANUFACTURING MULTI-COMPONENT FUNCTIONAL ARTICLE

(71) Applicant: Vadient Optics, LLC., Beaverton, OR (US)

(72) Inventor: George Williams, Portland, OR (US)

(73) Assignee: Vadient Optics, LLC, Beaverton, OR (US)

( * ) Notice: Subject to any disclaimer, the term of this patent is extended or adjusted under 35 U.S.C. 154(b) by 124 days.

(21) Appl. No.: 14/618,965

(22) Filed: Feb. 10, 2015

(65) Prior Publication Data

US 2015/0343707 A1  Dec. 3, 2015

Related U.S. Application Data

(63) Continuation-in-part of application No. 14/599,731, filed on Jan. 19, 2015, and a continuation-in-part of application No. 14/599,917, filed on Jan. 19, 2015, and a continuation-in-part of application No. 14/293,574, filed on Jun. 2, 2014, and a continuation-in-part of application No. 14/299,777, filed on Jun. 9, 2014, and a continuation-in-part of application No. 14/480,426, filed on Sep. 8, 2014, now Pat. No. 9,308,731, and a continuation-in-part of application No. 14/307,071, filed on Jun. 17, 2014, and a continuation-in-part of application No. 14/480,515, filed on Sep. 8, 2014, and a (Continued)

(51) Int. Cl.
| | |
|---|---|
| *G02B 13/14* | (2006.01) |
| *B29C 67/00* | (2017.01) |
| *G06Q 20/12* | (2012.01) |
| *G06Q 50/04* | (2012.01) |
| *B33Y 50/02* | (2015.01) |
| *G05B 19/042* | (2006.01) |

(52) U.S. Cl.
CPC .......... *B29C 67/0088* (2013.01); *B33Y 50/02* (2014.12); *G05B 19/0426* (2013.01); *G06Q 20/1235* (2013.01); *G06Q 50/04* (2013.01); *G05B 2219/2646* (2013.01); *Y02P 90/30* (2015.11)

(58) Field of Classification Search
CPC . B29C 67/0088; B29C 67/0051; B33Y 50/02; B33Y 50/00; G05B 19/0426; G05B 2219/2646; G06Q 20/1235; G06Q 50/04; Y02P 90/30
USPC .......................................................... 359/356
See application file for complete search history.

(56) References Cited

U.S. PATENT DOCUMENTS

| | | |
|---|---|---|
| 8,412,588 B1 | 4/2013 | Bodell et al. |
| 2006/0064385 A1 | 3/2006 | Susnjara |
| 2012/0092724 A1 | 4/2012 | Pettis |

(Continued)

*Primary Examiner* — Euncha Cherry

(57) ABSTRACT

A method of manufacturing a multi-material functional article, the method comprising the steps of providing a design module from a database, the design module encoded with physical characteristics, material needs, additive manufacturing equipment required, and performance outputs required for modeling a multi-material functional article, allowing a user access to the design module to integrate the design module into a functional article design, having the design module interface with available additive manufacturing equipment and allowing the user to print the multi-material functional article.

21 Claims, 4 Drawing Sheets

Related U.S. Application Data continuation-in-part of application No. 14/554,399, filed on Nov. 26, 2014.

(56) References Cited

U.S. PATENT DOCUMENTS

| | | |
|---|---|---|
| 2014/0058959 A1 | 2/2014 | Isbjornssund et al. |
| 2014/0156053 A1* | 6/2014 | Mahdavi ................ G06Q 50/04 700/119 |
| 2014/0157579 A1 | 6/2014 | Chhabra et al. |
| 2014/0222859 A1 | 8/2014 | Rathod |
| 2014/0244017 A1 | 8/2014 | Freiwirth et al. |
| 2015/0350278 A1 | 12/2015 | Isbjornssund et al. |

* cited by examiner

METHOD OF MANUFACTURING MULTI-COMPONENT FUNCTIONAL ARTICLE

REFERENCE TO RELATED APPLICATIONS

This application is a continuation-in-part of pending U.S. patent application Ser. No. 14/599,731 filed on Jan. 18, 2015 and is also a continuation-in-part of pending U.S. patent application Ser. No. 14/599,917 filed on Jan. 18, 2015 and is also a continuation-in-part of pending U.S. patent application Ser. No. 14/293,574, filed on Jun. 2, 2014, and is also a continuation-in-part of U.S. patent application Ser. No. 14/299,777, and is also a continuation-in-part of pending U.S. patent application Ser. No. 14/480,426, filed on Sep. 8, 2014, and is also a continuation-in-part of pending U.S. patent application Ser. No. 14/307,071, filed on Jun. 17, 2014, and is also a continuation-in-part of pending U.S. patent application Ser. No. 14/480,515, filed on Sep. 8, 2014, and is also a continuation-in-part of pending U.S. patent application Ser. No. 14/554,399 filed on Nov. 26, 2014, all of which are hereby incorporated by reference in their entireties.

STATEMENT OF GOVERNMENT INTEREST

Not applicable.

TECHNICAL FIELD OF THE INVENTION

The present invention relates in general to methods of manufacturing articles with additive manufacturing equipment. The invention relates in particular to manufacturing multi-material functional articles using design modules implementing additive manufacturing processes.

DISCUSSION OF BACKGROUND ART

Traditional manufacture of a functional articles made of multiple components typically require a plurality of separate components manufactured separately. Mechanical, electrical, and optical components are each manufactured using different specialized processes. Generalizing, mechanical components are manufactured at a machine-shop with specialized equipment to machine the part based on its size, material and complexity. Likewise, an optical component such as a lens may be manufactured at an optical-house with grinding and polishing equipment or optical fiber may be drawn at a draw-tower. Electronic components, such as an integrated circuit, are typically made in semiconductor fab. The components are represented by distinct and separable drawing or electronic designs. The components are manufactured separately based on the drawing, and then integrated to create the multicomponent functional article.

Design and manufacture of the functional article whether mechanical, electrical, optical or combinations thereof, require considerable engineering, time, and expense. Typically an engineer or team of engineers design the components, send the designs to different sites for manufacturers, and then assemble or contract for assembly of the functional article To provide mass markets the functional article the functional articles must be manufactured at off-the-shelf volumes or comprise of off-the-shelf components. Otherwise functional articles must be manufactured at higher cost on a per order basis with longer lead times due to the manufacturing process. Availability of the functional articles to consumers, whether for direct use or integration into another design, is then limited based on the functional articles use by large manufacturers. The design and manufacture of functional articles that are otherwise viable and useful are then unavailable to consumers and designers of the functional articles. Likewise incentive to design the functional articles is stifled.

This application relates to another approach.

SUMMARY OF THE INVENTION

The present invention is directed to methods of manufacturing multi-material functional articles. In one aspect, a method of manufacturing an article comprises the steps of providing a design module from a database, the design module encoded with specifications, material needs, additive manufacturing equipment required, and performance outputs required for modeling a multi-material functional article. Then allowing access to the design module to integrate the design module into a functional article design. Then having the design module interface with available additive manufacturing equipment. Last, allowing the multi-material functional article to be printed.

BRIEF DESCRIPTION OF THE DRAWINGS

The accompanying drawings, which are incorporated in and constitute a part of the specification, illustrate preferred methods and embodiments of the present invention. The drawings together with the general description given above and the detailed description of preferred methods and embodiments given below, serve to explain principles of the present invention.

DETAILED DESCRIPTION OF THE INVENTION

Figure 1:
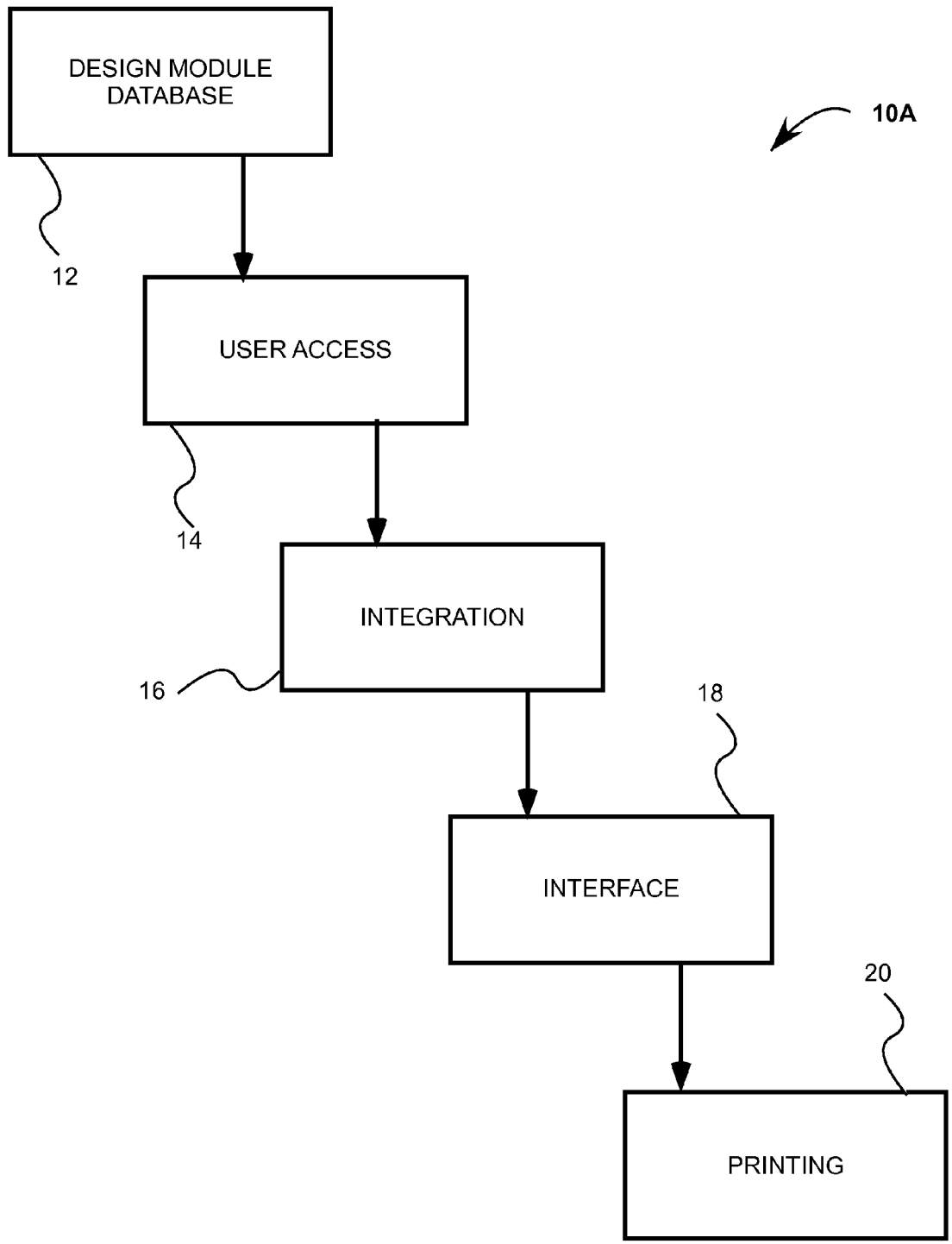
FIG. 1 is a flow diagram illustrating a method of manufacturing a multi-material functional article, the method comprising the steps of providing a design module from a database, the design module encoded with physical specifications, material needs, additive manufacturing equipment required, and performance outputs of the multi-material functional article, allowing a user access to the design module to integrate the design module into a functional article design, having the design module interface with available additive manufacturing equipment and allowing the multi-material functional article to be printed.

Referring now to the drawings, wherein like components are designated by like reference numerals. Methods and embodiments of the present invention are described further hereinbelow.

FIG. 1 schematically illustrates flow diagram 10A, a method of manufacturing a multiple component functional article, the method comprising the steps of providing a design module from database 12, the design module encoded with physical characteristics, material needs, additive manufacturing equipment required, modeling files, additive manufacturing processes, and performance outputs required for printing a multi-material functional article. Allowing a user access 14 to the design module. Allowing the user to integrate 16 the design module into a functional article design. Having design module interface 18 with available additive manufacturing equipment and allowing the user to print 20 the multi-material functional article.

The design module is an encoded file with the information necessary to integrate and print the multi-component functional article design embodied by the design module with available additive manufacturing equipment. Here, multi-component functional article means an article of various components, the components operating in cooperation to give the article functionality. Preferably the database has the design modules aggregated and accessible via the internet or public or private cloud-based clients.

Designers of the design modules can upload design modules to allow user integration. Preferably the database is managed to control the submissions of the design modules based on proven and printable designs. The design modules are preferably indexed and searchable according to specifications, performance input and outputs, material requirements, and additive manufacturing equipment required. The user can then search among the design modules to either print the embodied multi-component functional design individually, or integrate a plurality of design modules into a more complex design.

The design module can represent a single component or preferably the design module is encoded with multiple integrated components. For example, the design module can be encoded with mechanical, electrical, optical, magnetic, and thermal based systems, sub-systems and combinations thereof. Nonlimiting examples of basic components include such as fasteners, structural cores, resistors, capacitors, inductors, lenses, and waveguides. More complex examples include electro-mechanical actuated members, electro-optic devices, and integrated circuitry such as amplifiers and transistor. Similar to the semiconductor industry, in which a complex electrical design are embodied by intellectual property cores (IP-cores) which include series of lithography steps to create the design in a semiconductor fabhouse, the present invention enables complex mechanical, electrical, and optical systems to be designed and manufactured. The design modules, similar to IP-cores, are made available to users to integrate into more complex designs. The users can then offer those more complex designs as design modules or retain such designs and print the multi-component functional articles for use or sale.

The design modules are encoded for manufacture on additive manufacturing equipment. Nonlimiting examples of additive manufacturing techniques include stereolithography (SLA), selective laser sintering (SLS), laminated object manufacturing (LOM), fused deposition modeling (FDM), electron beam melting (EBM), and selective laser melting (SLM), powder bed manufacturing and combinations thereof. The additive manufacturing equipment is preferably capable of depositing a plurality of materials.

Such additive manufacturing printers are available from a variety of manufacturers. Nonlimiting examples include manufactures such as 3DSystems Inc. of Rock Hill, S.C., EnvisionTEC, Inc. of Dearborn, Mich., FujiFilm of Japan, and Stratasys Inc. of Minneapolis, Minn. Hybrid approaches, based on powder bed printing include plaster-based printing wherein a binder is inkjet deposited onto granular material in a powder bed and then cured. One such hybridized material printer is the HP Multi Jet Fusion™ available from Hewlett Packard of Palo Alto, Calif. Another hybridized 3D printer based on inkjet technology and nano-particles is described in U.S. patent application Ser. No. 14/480,426 commonly owned by the assignee of the present invention and hereby incorporated by reference in its entirety.

Figure 2:
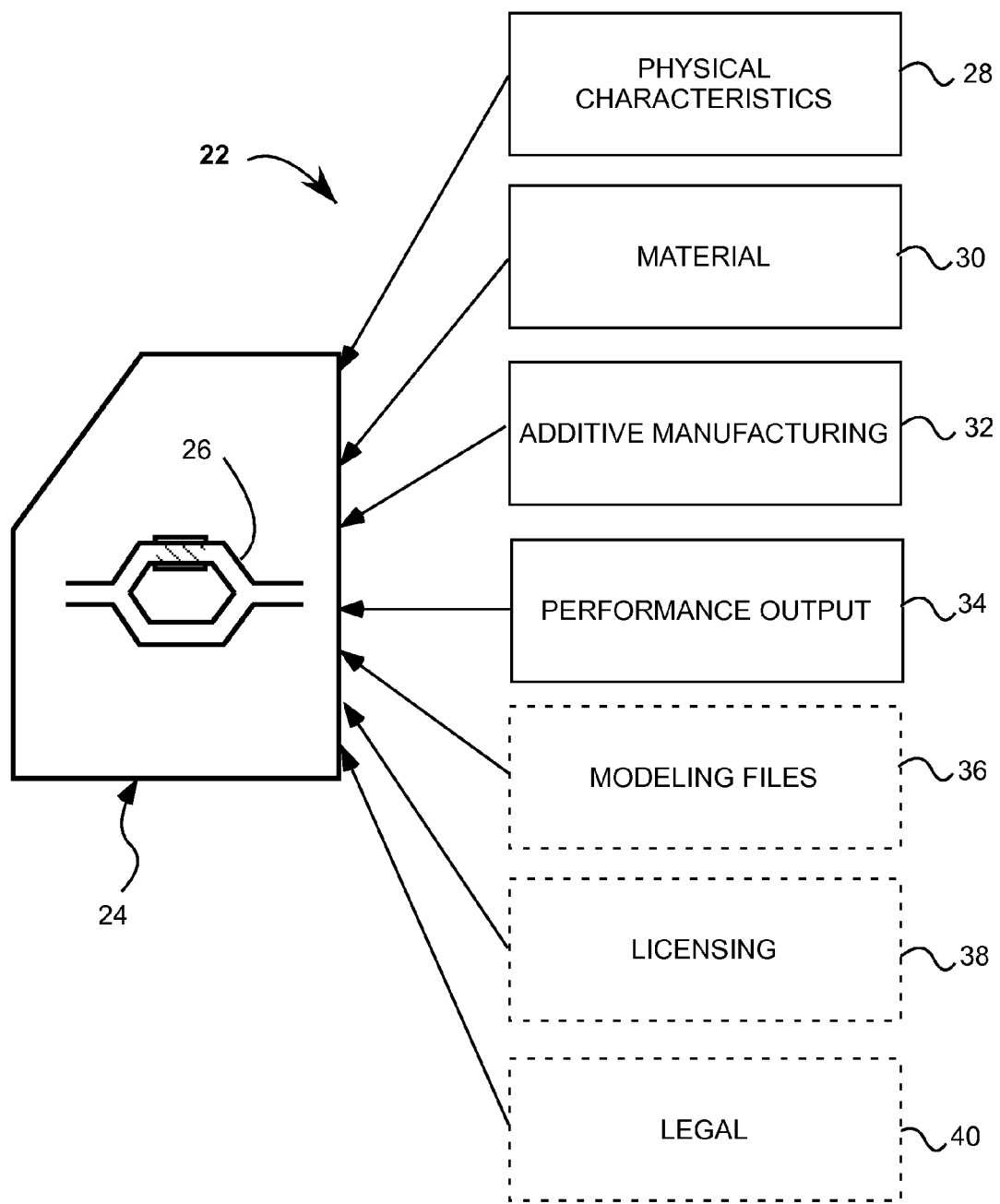
FIG. 2 is a conceptual diagram of the design module.

FIG. 2 is conceptual diagram 20 of design module 22. Design module 22 is encoded with specifications 28, material needs 30, additive manufacturing equipment 32, and performance output 34. Optionally, the design module can further include modeling files, licensing and legal information.

The specifications include the basic physical characteristics including the shape, volume, and orientation and preferably include operating parameters such as mechanical/structural, thermal, electrical, optical, magnetic properties and combinations thereof. For instance any given component will occupy a certain volume and have limited orientations options based on the printing process. Further the component will have performance characteristics and related operating conditions and ranges. Such parameters inform the user of viability in multiple component function article.

By way of example, a printable optical-element may specify orientation as limited by the printing process. For a refractive based optical-element, the design may specify numerical aperture (NA), focal length, thickness, working distance, internal and external transmittance, surface type, surface constants, surface irregularity, transmitted wavefront aberration, design wavelength or wavelength range, Abbe-Number, refractive-index or dispersion curve, birefringence, partial dispersion, operating temperature range, thermal coefficient of expansion (TCE), damage threshold, and related process dependent variations thereof. With additive manufacturing equipment, such as an inkjet printer, gradient refractive optical-elements (GRIN) can be manufactured. Such GRIN optics need further specification of the refractive gradient profile, effective focal length, pitch, and GRIN-Abbe number.

The design module also includes the material requirements needed to print the embodied article. The materials needs can include the basic material description and substitutes. If specialized material is required, the design module preferably includes the manufacturers of the specialized material and allows access to manufacturer provide batch data if needed. Batch data is especially useful when the performance of the apparatus depends on the material properties. For instance the aforementioned refractive optical-element will have performance limitations based on the optical properties of the transparent material deposited. Further optical-elements such as GRIN optics require variation in the optical properties to generate the refractive gradients. Such optical elements require a plurality of materials, mixed before or upon deposition. One method of providing such refractive gradients and providing the material required by depositing polymers with varying concentrations of dispersed nanoparticles is described in U.S. patent application Ser. No. 14/299,777 assigned to the assignee of the present invention and hereby incorporated by reference in its entirety.

In general, the material required depends on the particular additive manufacturing equipment used. For instance in fused deposition modeling, a filament line is usually employed. The filament line is typically made from a polymer, but can be, or be embedded with, other materials, including metals, ceramics, and organic matter to make composite filaments. With systems incorporating inkjet technology, a multitude of ink materials and composites can be used. Likewise for powder bed systems, a multitude of particle materials, sizes, and composites can be employed.

Preferably the design module is encoded with requisition information necessary to purchase and order the materials needed for printing. Such information can be part of or complement license arrangements for access, integration, and printing described further hereinbelow. Similarly, the design module can be encoded with the information necessary to produce the required materials. For instance, the design module can provide the instructions for producing the required material or otherwise control the production of material in additive manufacturing equipment that creates custom material on demand. One example of an inkjet 3D printer that produces printable nanocomposite material on demand with variable nanoparticle material, size and concentration is described in U.S. patent application Ser. No. 14/480,426 commonly owned by the assignee of the present invention and hereby incorporated by reference in its entirety.

The design module is encoded with the compatible additive manufacturing equipment required and printing parameters. The design module can specify particular additive manufacturing equipment and preferably provide specified printing parameters required for manufacture. For designs that do not require specialized printing process control, the design module can provide or allow slicer software to access to the computer-aided design (CAD), standard tessellation file (STL), step-file (STEP), or other such representation and determine the printing process. For components that cannot otherwise be manufactured with additive manufacturing technology alone the design module includes the methods and instruction to integrate the chips before, during, or after the printing process. For instance a design module may incorporate a semiconductor chip, or plurality of electrical components, which must be positioned within the multi-component functional article during the printing process. The design module can be encoded with appropriate processes to pause printing, allow placement of the components, confirm placement, and then resume printing.

By way of example, when the design module requires an inkjet printer to manufacture the multi-component functional article, a variety of process related parameters must be specified. For instance, nonlimiting process parameters for 3D inkjet printing include nozzle temperature, substrate temperature, ambient temperature, droplet viscosity, droplet size, droplet velocity, droplet settle time, boundary conditions between adjacent droplets, deposition frequency, deposition pattern, deposition angle, deposition accuracy, deposition repeatability, cure mechanisms required, cure exposure time, material shrinkage or expansion, stage speed, substrate or material wettability, material deposition order, and deposition pattern. As another example, laser sintered processes share some of those process patterns listed above as well as laser wavelength, frequency, pulse energy, pulse width, spectral properties of the particles, particles size, and dwell time.

The design module can employ a variety of deposition techniques both additive and subtractive to print the multi-component functional article. Based on the employed processes, the design module preferably constrains or otherwise provides guidelines for proper integration of the design modules. For instance the functional article may have metal-based materials which require a sintering process to achieve conductivity. Such processes may reach temperatures incompatible with other materials and require a particular order of deposition, curing, and dwell and cessation period for heat dissipation. Similarly the design modules may have sacrificial areas, removable support structures, or implement subtractive processes.

The design module also preferably controls feedback mechanisms. The additive manufacturing equipment may have thermistors, flow sensors, particle counter, machine vision and other such feedback mechanisms. The design module can control, for instance, a camera based machine vision systems which monitors deposition and manufacture of the article.

The design module must interface with available additive manufacturing equipment to determine compatibility and printing viability. For instance the design module can interface with a local 3D printer or a contract manufacturer. The design module can use IP-based protocols to control delivery, access, authentication, and encryption of the data transmitted to network and offsite additive manufacturing equipment.

The design module can further include modeling files 36. The modeling files are desirable when the design module embodies a component or subsystem that can used in a more complex design by another designer. The modeling files are preferably in a form compatible for use in commercially available design and engineering software. The modeling files can include optimization algorithms. Additionally the modeling files can include different configurations of the embodied multi-component functional design.

For instance, 3-dimensional objects can be represented graphically in computer aided drafting software such as Solidworks, available from Dassault Systemes of Waltham, Mass. Such software packages provide simulation and analysis of structural forces, mechanical motion, fluid flow, and heat transfer. Another such multiphysics software platform that provides simulation and analysis of mechanical, fluid, electrical, optical, and chemical phenomena is provided by COMSOL, Inc. of Burlington, Mass. Optical systems are generally modeled in software such as ZEMAX, from Zemax, LLC in Redmond, Wash., Code V from Synopsys in Mountain View, Calif., and OSLO from Lambda Research Corp. of Littleton, Mass. Advanced electronics can be modeled using SPICE software to simulate and verify designed circuitry. For advanced integrated circuitry design within the multi-material functional article software from a variety of suppliers such as Cadence Design Systems, Tanner EDA, Silvaco, Inc., Synopsys, Inc., and Mentor Graphics Corp.

The design module can include optimization algorithms. The optimization algorithms can be based on the user requirement and constrained by the available additive manufacturing equipment available. By way of example, the design module can have optimization algorithms to optimize the aforementioned optical-element. For instance, if a focusing optic is desirable, the optimization algorithm can provide solutions based on desired performance such as focal length, diameter, shape, thickness, and wavelength range, while taking into aforementioned process constraints. For such designs, additive manufacturing processes are particularly well-suited to manufacture gradient refractive index optics. See U.S. patent application Ser. No. 14/599,731 which generally describes inkjet printing gradient refractive index (GRIN) optics and in particular describes achromatic GRIN optic design, commonly owned by the assignee of the present invention and hereby incorporated by reference in its entirety.

Complementing or in addition to optimization algorithms, the design module can further include different configurations. For example the aforementioned design module that embodies the optical switch may have a plurality of configurations allowing the user to choose between different waveguide sizes, input and output locations, and operating parameters such as operating voltage. Likewise a design module that embodies a resistor or capacitor may have different deposition techniques and spatial configurations which allow for different sizes, volumes, and respective resistance or capacitance values. In turn the design modules which incorporate the design modules of other can have multiple configurations based on the available configurations of the incorporated design modules. For instance a design module of electronic amplifier design may incorporate a plurality of different value resistors, all of which are configurations of a single resistor design module.

The modeling files preferably have parametric based models features which respond to related design module input and outputs. For instance an amplifier design module may utilize a specific wire size and an accompanying wire design module will preferably adjust size, for instance diameter, when mated to the amplifier. Likewise, a design module of a waveguide preferably has parametrically adjustment based on coupling to other optical waveguides, or wavelengths used.

Licensing data can be encoded within the design module to allow restitution to the designer or assignee of the design module. Related legal info can be included to provide legal notice, whether for contractual purposes or intellectual property protection. In order to enforce license rights and other legal obligations the design module can also include IP-protocols and encryption.

Licensing fees or other obligations can be collected at various stages in the process and in various fee structures. Fees can be collected during the process based access to the design module, access to the modeling files, or on a per print basis, and hybrid combinations thereof. For instance, fees can be charged to obtain access to the individual design modules. Alternatively, the design modules can be aggregated in groups and access to the group allowed after fee payment. If access to the design module is open, the fees can be charged upon on a per-print basis. Further, if the user is a designer who intends to create yet another design module, integration can be limited based on obligation to pay a sub-license fee.

Fee structures can be based on temporal access, user status, configuration, or print volume and other such arrangements. For instance, a temporal based structure, such as a monthly membership, can provide a user the ability to access, integrate, or print a single or group of the licensed design modules. Fees can vary based on the configuration. For example, if a design module has a configuration with better performance or design sophistication, the license fee can be structured accordingly. License fees based on a per-print basis can be structured with volume pricing.

The design modules which are intended for integration other of the design modules preferably have license agreements that incentivize integration. For instance design modules that can be used numerous times within another the design modules preferably have license arrangements based on volume, percent usage, or percent of the gross revenue with.

Depending on the license fee structure access to the design modules can be granted by delivery of physical or preferably electronic deliverable encryption keys. Likewise the design modules can be delivered in physically encoded mediums, but are preferably delivered electronically after payment of any required fees. Alternatively, encryption keys can be given and access, or ability to print granted based on purchase of printable material. The encryption keys can be limited to per-print activations, requiring persistent online authentication, and other such digitally controlled limitations.

The design modules can also include legal information and protocols such as digital rights management software to ensure enforcement and protection of intellectual property rights. For instance design modules can include trademark designs, copyright material, and patented apparatus and methods. The design module can require designs integrating the design modules to be appropriately labeled and marked. For instance if the functional article incorporates a design module that embodies a patented apparatus or article, the design module can require the patent number to be printed on the exterior of the functional article. Likewise if the functional design embodied in the design module contains trademarks, artwork, trade dress, or other such protectable matter, the design module can require proper implementation and marking, or otherwise prevent manufacture.

Figure 3:
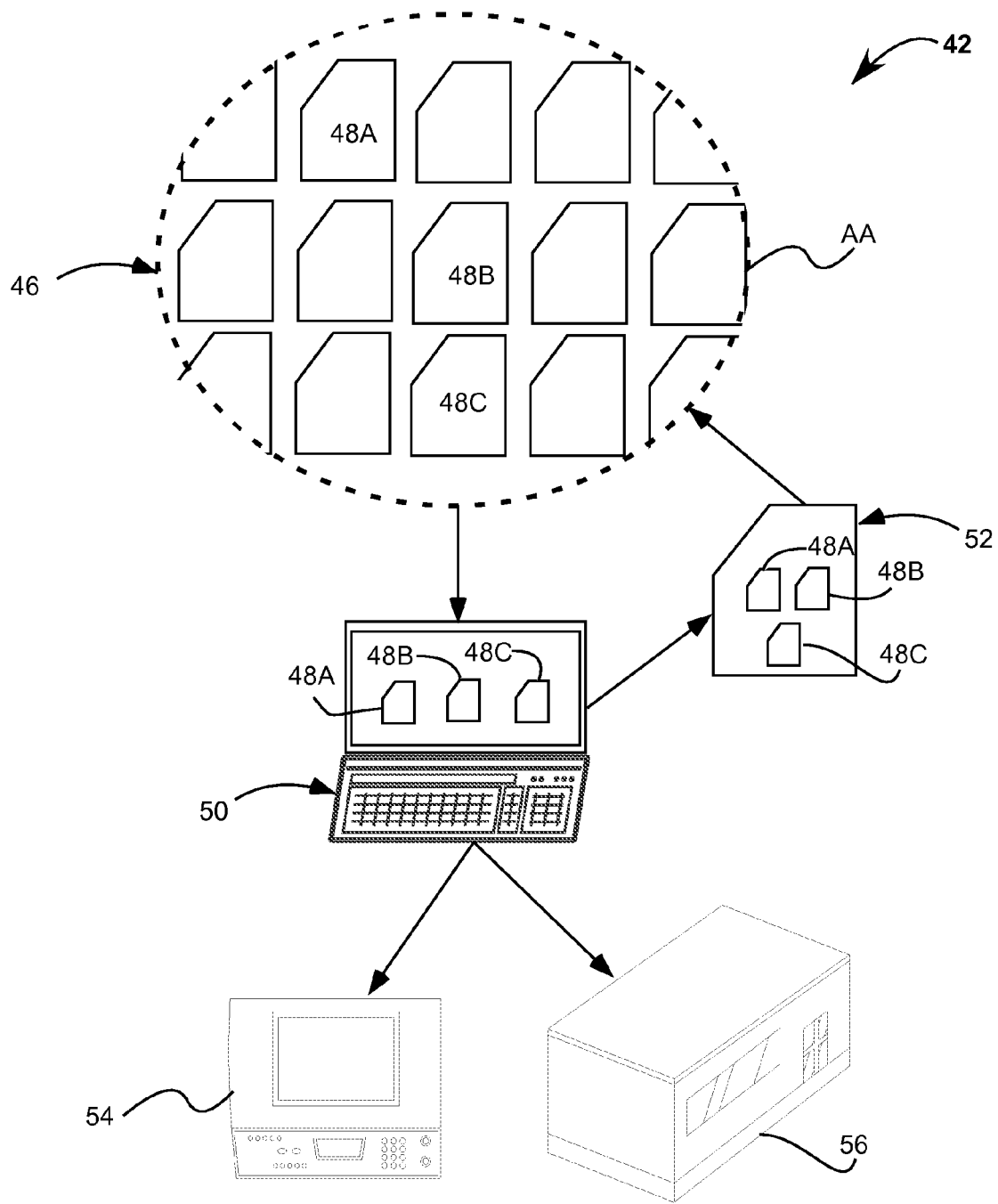
FIG. 3 is a conceptual overview of the method of manufacturing of the multi-material functional article based on a plurality of the design modules.

FIG. 3 is conceptual diagram 40 illustrating the method of modeling and integrating the design modules into the multi-component functional article. Database 46 has a plurality of the design modules of which design module 48A, 48B, and 48C are exemplified. User 50 determines the required performance of the functional design and obtains access to and searches database 46. User 50 determines that design module 48A, 48B, and 48C can be utilized in the design of the multi-material functional article. The user integrates design files 48A, 48B, and 48C, using any available modeling files and complying with any aforementioned licensing agreement required by the individual design modules. The design modules interface with any local additive manufacturing equipment, such as 3D-printer 54 to determine printing compatibility or alternatively interfaces with offsite manufacturing 56 to print the multi-component functional article.

Additionally, user 50 can create new design module 52 based on the multi-component functional article design created by integrating design modules 48A, 48B, and 48C. The user can then upload new design file 52 to database 46, preferably subject to review by the database manager, allowing other users to access the design module in database 46. Additional users then can manufacture the embodied multi-component functional article.

Figure 4:
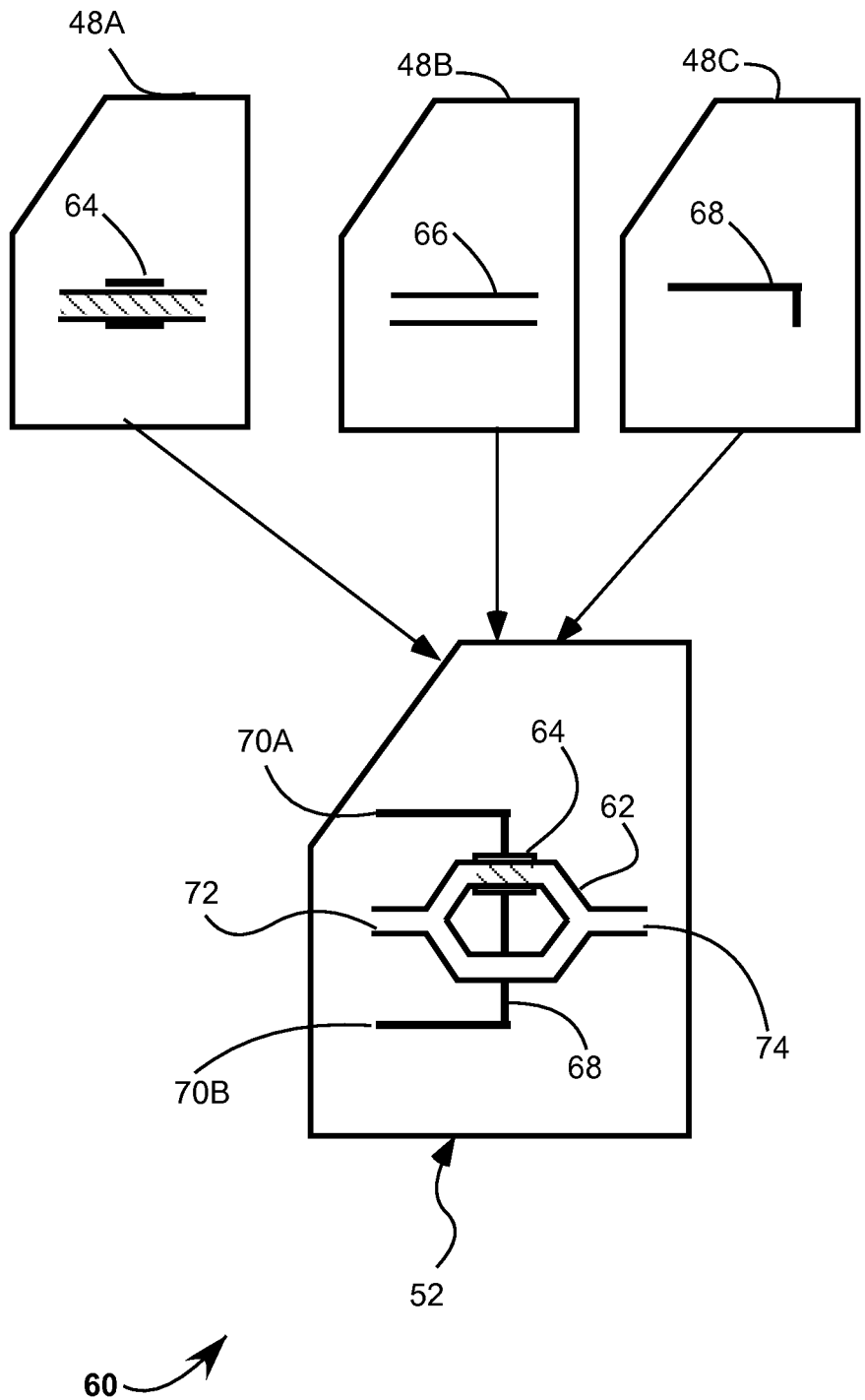
FIG. 4 is diagram illustrating a nonlimiting example of the design module of that shown in FIG. 3.

FIG. 4 is diagram 60 conceptually illustrating a specific example of design module 52 as shown in FIG. 3, wherein the embodied multi-component functional article is an optical switch. Design module 52 is the result of integration of design modules 48A, 48B, and 48C. Design module 48A embodies electro-optical waveguide 64 with conductive pads suspended, or printable on the surface of a printable dielectric medium. Design module 48B embodies optical waveguide 66 suspended or printable on the surface of the dielectric medium. Design module 48C embodies conductive wire 68, again suspended, or printable on the surface of a dielectric medium. The resulting integration of the design modules result in design module 52 which embodies an optical switch. As design modules 48A, 48B, and 48C are already encoded with the information necessary to integrate and print each component, design module 52 requires little or no further development.

Design module 52 exemplifies the multi-component functional article wherein a plurality of design modules are used. Design module 52 can be printed as is or can be used in more complex designs. For instance the optical switch has wire interfaces 70A and 70B to modulate the electro-optic region and has waveguide input port 72 and waveguide exit port 74. Other such electro-optic and high order nonlinear optical-elements that are, or can be combined to create the multiple component functional articles are described in U.S. patent application Ser. Nos. 14/278,164 and 14/293,574, both commonly owned by the assignee of the present invention and hereby incorporated by reference in their entirety.

From the description of the present invention provided herein one skilled in the art can implement the method of manufacture in accordance with the present invention. While the present invention has been described in terms of particular examples, others can be implemented without departing from the invention. In summary, the present invention is described above in terms of particular embodiments. The invention, however, is not limited to the embodiments described and depicted herein. Rather, the invention is limited only by the claims appended hereto.

What is claimed is:

1. A method of manufacturing an article, the method comprising the steps of:
    a. providing a plurality of design modules in a database, the design modules encoded with specifications, additive manufacturing equipment required, materials required, printing process, performance input and outputs required for integrating, modeling, and printing a multi-component functional article;
    b. allowing access to the design modules to integrate at least one of the design modules into a multicomponent functional article design;
    c. having the design modules interface with available additive manufacturing equipment; and
    d. allowing the multi-component functional article to be printed.

2. The method of claim 1, wherein the design module is encoded with an electro-optic device design.

3. The method of claim 1, wherein the design module is encoded with an optical device design.

4. The method of claim 1, wherein the design module is encoded with an electronic device design.

5. The method of claim 1, wherein the design module is encoded with a mechanical device design.

6. The method of claim 1, wherein the multi-component functional article design integrates a plurality of the design modules.

7. The method of claim 1, wherein the design modules comprise of a plurality of functional components.

8. The method of claim 1, wherein the design module include a design file for modeling the multi-component functional article in commercially available software.

9. The method of claim 1, wherein the design module includes process parameters to print the multi-component functional design.

10. The method of claim 1, wherein the design module is encoded with vendor data necessary to purchase the materials needed to print the design module.

11. The method of claim 10, wherein the design module is encoded with a range of material properties required to achieve the specified level of performance of the module.

12. The method of claim 1, wherein the design module is encoded for inkjet printing.

13. The method of claim 1, wherein the design module is encoded for direct printing using one or more additive manufacturing equipment technologies from the group consisting of stereolithography (SLA), selective laser sintering (SLS), laminated object manufacturing (LOM), fused deposition modeling (FDM), electron beam melting (EBM), selective laser melting (SLM), powder bed manufacturing, or combinations thereof.

14. The method of claim 1, wherein the material required in the design module includes a nanocomposite-ink.

15. The method of claim 1, wherein the design module is provided in an electronic downloadable form.

16. The method of claim 1, wherein the design modules include a resistor, a capacitor, or inductor.

17. The method of claim 1, wherein the design module includes a method of inserting and electrically integrating an integrated circuit.

18. The method of claim 1, wherein the design module specifications include a transfer curve describing one or more electrical, mechanical, optical, or magnetic transformation input and output.

19. The method of claim 1, wherein the design module includes licensing data.

20. The method of claim 19, wherein step (b) requires payment of a license fee in order to access the design module.

21. The method of claim 19, wherein step (c) requires payment of a license fee to print the article.

* * * * *